(12) United States Patent
Kanda et al.

(10) Patent No.: US 12,542,134 B2
(45) Date of Patent: *Feb. 3, 2026

(54) TRAINING AND USING A TRANSCRIPT GENERATION MODEL ON A MULTI-SPEAKER AUDIO STREAM

(71) Applicant: Microsoft Technology Licensing, LLC, Redmond, WA (US)

(72) Inventors: Naoyuki Kanda, Bellevue, WA (US); Takuya Yoshioka, Bellevue, WA (US); Zhuo Chen, Bellevue, WA (US); Jinyu Li, Sammamish, WA (US); Yashesh Gaur, Redmond, WA (US); Zhong Meng, Mercer Island, WA (US); Xiaofei Wang, Bellevue, WA (US); Xiong Xiao, Bothell, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,277

(22) Filed: Apr. 10, 2024

(65) Prior Publication Data
US 2024/0257815 A1 Aug. 1, 2024

Related U.S. Application Data

(63) Continuation of application No. 17/566,861, filed on Dec. 31, 2021, now Pat. No. 11,984,127.

(51) Int. Cl.
*G10L 17/00* (2013.01)
*G10L 15/06* (2013.01)
(Continued)

(52) U.S. Cl.
CPC .............. *G10L 17/04* (2013.01); *G10L 15/06* (2013.01); *G10L 15/26* (2013.01)

(58) Field of Classification Search
CPC ......... G10L 15/06; G10L 15/00; G10L 15/04; G10L 15/05; G10L 15/063; G10L 15/065;
(Continued)

(56) References Cited

U.S. PATENT DOCUMENTS 11,984,127 B2 * 5/2024 Kanda ..................... G10L 15/06
2007/0071206 A1 * 3/2007 Gainsboro ........ H04M 3/42221
379/168

(Continued)

OTHER PUBLICATIONS

Takuo Henmi, Shengyang Huang and Fuji Ren, "Wisdom media "CAIWA Channel" based on natural language interface agent," Proceedings of the 6th International Conference on Natural Language Processing and Knowledge Engineering(NLPKE-2010), Beijing, 2010, pp. 1-8. (Year: 2010).*

(Continued)

*Primary Examiner* — Edgar X Guerra-Erazo
(74) *Attorney, Agent, or Firm* — Foley IP Law, PLLC

(57) ABSTRACT

The disclosure herein describes using a transcript generation model for generating a transcript from a multi-speaker audio stream. Audio data including overlapping speech of a plurality of speakers is obtained and a set of frame embeddings are generated from audio data frames of obtained audio data using an audio data encoder. A set of words and channel change (CC) symbols are generated from the set of frame embeddings using a transcript generation model. The CC symbols are included between pairs of adjacent words that are spoken by different people at the same time. The set of words and CC symbols are transformed into a plurality of transcript lines, wherein words of the set of words are sorted into transcript lines based on CC symbols, and a multi-speaker transcript is generated based on the plurality of transcript lines. The inclusion of CC symbols by the model enables efficient, accurate multi-speaker transcription.

12 Claims, 11 Drawing Sheets

(51) Int. Cl.
*G10L 15/26* (2006.01)
*G10L 17/04* (2013.01)

(58) Field of Classification Search
CPC ......... G10L 15/07; G10L 15/16; G10L 15/18;
G10L 15/183; G10L 15/20; G10L 15/26;
G10L 2015/0635; G10L 2015/0631;
G10L 2015/0633; G10L 2015/0636;
G10L 2015/0638; G10L 2015/221; G10L
15/22; G10L 15/222; G10L 2015/223;
G10L 2015/225; G10L 2015/226; G10L
2015/227; G10L 2015/228; G10L 17/00;
G10L 17/04; G10L 17/02; G10L 17/06;
G10L 17/12; G10L 17/18; G10L 17/20;
G06N 20/00; G06N 3/08; G06N 20/20;
G06N 20/10; G06N 3/02; G06N 3/088;
G06N 3/09; G06N 3/091; G06N 3/092;
G06N 3/094; G06N 3/096; G06N 3/098;
G06N 3/0985
See application file for complete search history.

(56) References Cited

U.S. PATENT DOCUMENTS

| | | | | |
|---|---|---|---|---|
| 2016/0179831 | A1* | 6/2016 | Gruber | G10L 19/018 704/235 |
| 2022/0383879 | A1* | 12/2022 | Agarwal | G06F 3/14 |
| 2023/0089308 | A1* | 3/2023 | Wang | G10L 15/063 704/232 |
| 2023/0215439 | A1* | 7/2023 | Kanda | G10L 17/04 704/235 |

OTHER PUBLICATIONS

Sun, G., Liu, D., Zhang, C., & Woodland, P. C. (Jun. 2021). Content-aware speaker embeddings for speaker diarisation. In ICASSP 2021-2021 IEEE International Conference on Acoustics, Speech and Signal Processing (ICASSP) (pp. 7168-7172). IEEE. (Year: 2021).*

Communication pursuant to Article 94(3) EPC Received in European Patent Application No. 22803130.8, mailed on Nov. 28, 2025, 04 pages.

First Examination Report Received for Indian Application No. 202417048493, mailed on Nov. 18, 2025, 08 pages.

* cited by examiner

TRAINING AND USING A TRANSCRIPT GENERATION MODEL ON A MULTI-SPEAKER AUDIO STREAM

CROSS-REFERENCE TO RELATED APPLICATION

This application is a continuation application of and claims priority to U.S. patent application Ser. No. 17/566,861, entitled "TRAINING AND USING A TRANSCRIPT GENERATION MODEL ON A MULTI-SPEAKER AUDIO STREAM," filed on Dec. 31, 2021, the disclosure of which is incorporated herein by reference in its entirety.

BACKGROUND

Modern meetings or other instances of communication between parties are often recorded so that the content of the communication can be reviewed after the communication is completed. Further, the recorded content is often analyzed, enhanced, and/or enriched to enable users to access and use the recorded content more accurately and efficiently. For instance, audio data is often analyzed such that transcript text data of the communication can be generated, including separating speech of multiple speakers that is simultaneous in the audio data so that the transcript is coherent. However, separating the speech of multiple speakers presents different challenges than automatic speech recognition on the speech of a single speaker, so it is difficult and computationally expensive to account for both situations when generating transcripts. Further, for use cases that need a transcript generated in real-time with the meeting or conversation, solutions that rely on post-conversation analysis are insufficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for generating a transcript from a multi-speaker audio stream with a trained model is described. Audio data including overlapping speech of a plurality of speakers is obtained and a set of frame embeddings are generated from audio data frames of the obtained audio data using an audio data encoder. A set of words and channel change (CC) symbols are generated from the set of frame embeddings using a transcript generation model. The CC symbols are included between pairs of adjacent words that are spoken by different people at the same time. The set of words and CC symbols are transformed into a plurality of transcript lines, wherein words of the set of words are sorted into transcript lines based on the CC symbols, and a multi-speaker transcript is generated based on the plurality of transcript lines.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 11, the systems are illustrated as schematic drawings. The drawings may not be to scale.

DETAILED DESCRIPTION

Figure 1:
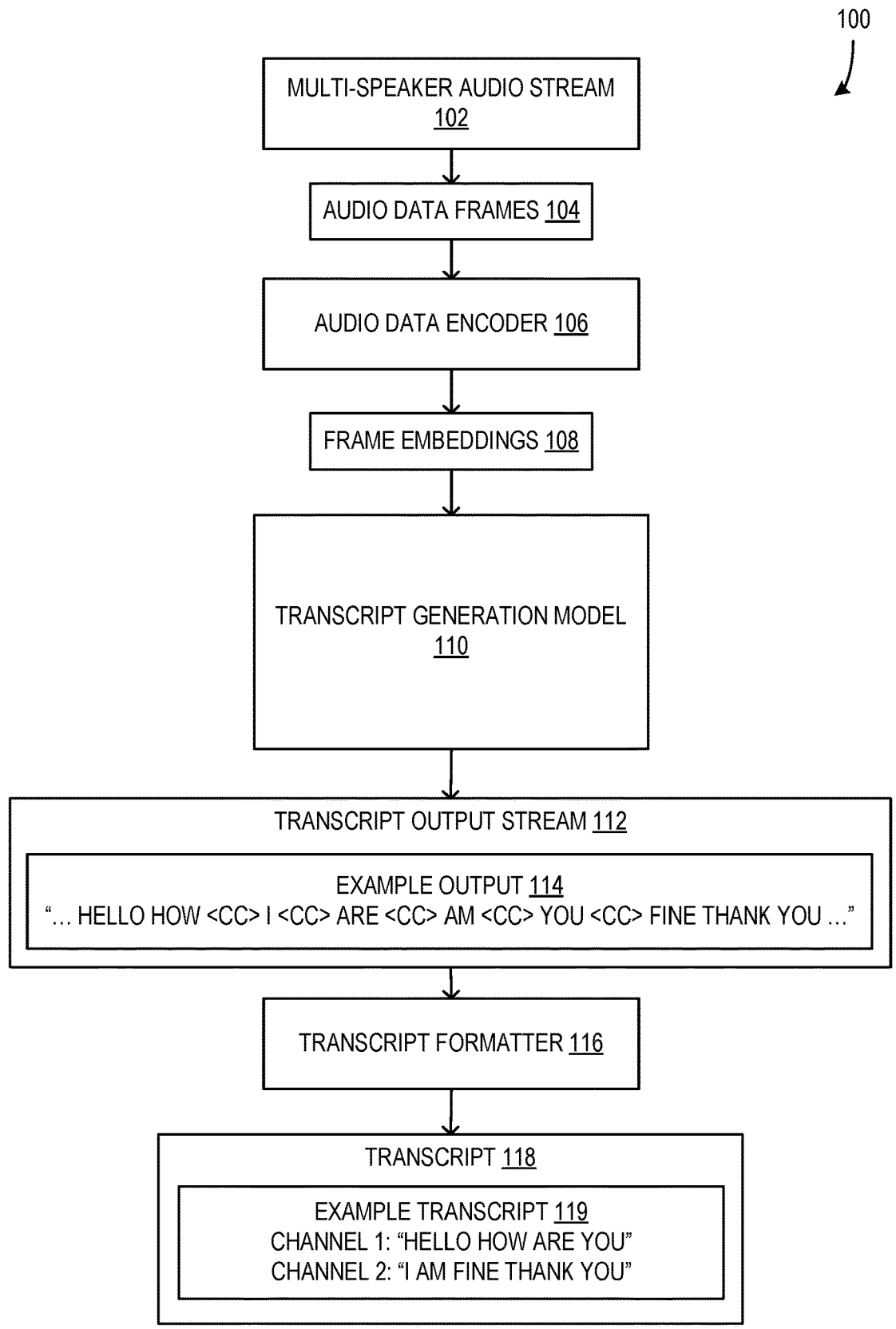
FIG. 1 is a block diagram illustrating a system configured to generate a transcript from a multi-speaker audio stream.

Aspects of the disclosure provide a computerized method and system for training a model such as a Recurrent Neural Network Transducer (RNN-T) to generate transcript data including symbols representing overlapping speech based on a multi-speaker audio stream. Audio data including overlapping speech (e.g., multiple words that are spoken by different people at the same time) of a plurality of speakers is obtained and a set of words and channel change (CC) symbols is generated from the obtained audio data using an encoder and a transcript generation model. The CC symbols are indicative of the words on either side of the symbols are spoken by different people at the same time. The set of words and CC symbols is transformed into a plurality of transcript lines, wherein words of the set of words are sorted into transcript lines based on the inserted CC symbols (e.g., the words classified into a first channel are sorted into a first transcript line and the words classified into a second channel are sorted into a second transcript line). Finally, a multi-speaker transcript is generated based on the plurality of transcript lines.

The disclosure operates in an unconventional manner at least by using the CC symbols to efficiently represent the moments in the audio data when two words are spoken at the same time by different people. The disclosed model is trained and configured to treat the CC symbols as any other symbol and to determine when a portion of the transcript output is highly likely to include a CC symbol. By training the model to add CC symbols to the training data like it adds other words, the disclosure performs the separation of overlapping words efficiently and accurately while avoiding the use of multiple models or other more computationally expensive speech separation methods.

Further, the use CC symbols as described enables the disclosure to generate the transcript data, including the CC symbols, in real-time as the audio stream is received and processed. The additional processing required to format the transcript data into a transcript is relatively minimal, so even the formatted transcript can be generated in real-time or near-real-time.

Additionally, the disclosure enables the use of d-vector analysis and/or the inclusion of a parallel speaker identification model that can be used to identify speakers in the audio stream and include that identification information in the generated transcript. Because the disclosed process of generating the transcript data is computationally efficient, these additional processes can be included for enhancing the resulting transcript while maintaining overall performance and efficiency advantages.

Further, the disclosure describes a process for generating training data for training the described transcript generation model. The training data generation process can be performed using existing multi-speaker audio and/or combinations of single-speaker audio. Training data can be generated from any such audio data to obtain a large and varied set of training data for the transcript generation model.

The disclosure provides accurate speech recognition with single and multiple speaker audio data in real-time at a low computational cost due to only requiring one pass on the audio data with the speech recognition model.

FIG. 1 is a block diagram illustrating a system 100 configured to generate a transcript 118 from a multi-speaker audio stream 102. The system 100 includes an audio data encoder 106, a transcription generation model 110, and a transcript formatter 116.

In some examples, the system 100 includes one or more computing devices (e.g., the computing apparatus 1118 of FIG. 11) upon which the components of the system 100 are located and/or executed. For instance, in an example, the system 100 is located and executed on a single computing device. Alternatively, in another example, the components of the system 100 are distributed across multiple computing devices that are in communication with each other via a network (e.g., an intranet, the Internet, or the like). In such an example, the encoder 106 and transcript generation model 110 are located on a first computing device and the transcript formatter 116 is located on a second computing device, such that the transcript output stream 112 is sent from the transcript generation model 110 to the transcript formatter 116 via a network connection between the first and second computing devices. In other examples, other organizations or arrangements of the components of the system 100 are used without departing from the description.

The multi-speaker audio stream 102 include audio data (e.g., data captures via microphone(s) or other audio capture devices) that includes the voices of multiple speakers (e.g., more than one person in a room speaking to each other, such as in a conference room having a meeting). The multi-speaker audio stream 102 is passed to the audio data encoder 106 in the form of audio data frames 104.

The audio data frames 104 are portions of the multi-speaker audio stream 102 that include audio data from a defined timeframe of the stream 102 (e.g., audio data over 3 second, 5 second, or 10 second intervals). In some examples, the length of each audio data frame 104 is static and/or consistent. Alternatively, in other examples, the length of each audio data frame 104 is dynamic, such that the length can vary from frame to frame. The lengths of the audio data frames 104 are defined or otherwise established during the configuration of the system 100 and/or the lengths of the audio data frames 104 can be updated or otherwise changed during operation of the system 100 or otherwise after the configuration of the system 100. In some examples, the lengths of the audio data frames 104 are based on degrees of efficiency and/or accuracy with which the system 100 can translate the audio data frames 104 into transcript output of the transcript output stream 112.

The audio data encoder 106 includes hardware, firmware, and/or software configured to receive an audio data frame 104 and encode the audio data of the frame 104 into a frame embedding 108. In some examples, the audio data encoder 106 analyzes details of the audio data in the frame 104 and generates the associated frame embedding 108 in the form of a vector of multiple numerical values. In such examples, the encoder 106 is configured to generate embeddings 108 that are usable by the transcript generation model 110 for automatic speech recognition (ASR) operations as described herein.

The transcript generation model 110 includes hardware, firmware, and/or software configured to receive frame embeddings 108 and to generate a transcript output stream 112 based on those received frame embeddings 108. In some examples, the transcript generation model 110 is configured to translate the embeddings 108 and/or portions thereof into words and/or other symbols (e.g., the change channel (<CC>) symbol) using a model or models that are trained using machine learning techniques. An exemplary transcript generation model is described in greater detail below with respect to FIG. 2.

The transcript output stream 112 of the transcript generation model 110 includes a string of ordered words and/or symbols that are generated by the transcript generation model 110 based on the frame embeddings 108. In some examples, for each portion of the frame embeddings 108, the transcript generation model 110 analyzes the portion and identifies or otherwise determines a most likely word or other symbol to generate in association with that portion. That most likely word or other symbol is selected from a dictionary or other set of symbols that have been used to train the transcript generation model 110 (e.g., the training data used during the training included the symbols in the dictionary symbols and embedding data that should be translated into those symbols). For instance, in an example, if a portion of an embedding 108 is from audio data of a person saying the word "how", the transcript generation model 110 generates a set of probability values associated with possible symbols where the probability value for the "how" symbol is the highest of the generated probability values. Then the "how" symbol is inserted into the transcript output stream 112.

Further, in some examples, the transcript generation model 110 is configured to generate and insert 'channel change' (CC) symbols into the transcript output stream 112 between other words and symbols. The CC symbol is indicative of overlapping spoken words of two speakers in the multi-speaker audio stream (e.g., when two speakers say words during the same timeframe, such that they are both speaking at the same time). The 'channels' referenced by the CC symbol are abstract or virtual channels into which the words on either side of the CC symbol are sorted, rather than separate audio channels captured from different microphones or the like. For instance, in the example output 114, the stream includes the symbols "Hello how <CC> I <CC> are". In this portion of the example output 114, the CC symbols (<CC>) are indicative of the words "how" and "I" being spoken by two different speakers and the words "I" and "are" being spoken by two different speakers. These CC symbols are used by the transcript formatter 116 to divide the words of the output stream 112 into two virtual channels when two speakers are speaking at the same time, as described below.

In some examples, the CC symbol is included in the symbol dictionary used to train the transcript generation model 110 such that the model 110 is configured to identify portions of embeddings 108 that are most likely to be indicative of a CC symbol and to insert a CC symbol into the transcript output stream 112 based on that identification. A process of determining where CC symbols are inserted into the transcript output (e.g., the transcript output stream 112) is described in greater detail below with respect to FIG. 3.

Further, in some examples, more and/or different symbols than <CC> are used without departing from the description. Additional variations using other symbols are described below with respect to FIGS. 5 and 7 (SR symbols and multiple numbered CC symbols, respectively).

The transcript formatter 116 includes hardware, firmware, and/or software configured for formatting the transcript output stream 112 into a transcript 118 (e.g., example transcript 119) that includes separate channels for simultaneous speakers. In some examples, the transcript formatter 116 iterates through the transcript output stream 112 and processes CC symbols when it reaches them. Upon reaching a CC symbol, the formatter 116 places the following word or symbol into the channel opposite the preceding word or symbol (e.g., if the preceding word is in channel one, the formatter 116 puts the following word in channel two, and vice versa). The words or symbols in the two virtual channels are included in the transcript in separate lines or separated in some other manner, such that the words of the first speaker are separated from the words of the second speaker.

For instance, in the example transcript 119, the example output 114 has been formatted into two different lines of words for channel one and channel two. "Hello" and "how" are included in channel one and then "I" is included in channel two due to the CC symbol between "how" and "I". Then, "are" is included in channel one due to the CC symbol between "I" and "are", "am" is included in channel two due to the CC symbol between "are" and "am", and "you" is included in channel one due to the CC symbol between "am" and "you". Finally, "fine", "thank", and "you" are included in channel two due to the CC symbol between "you" and "fine". This results in the transcript 119 including a channel one line of "Hello how are you" and a channel two line of "I am fine thank you".

During times when only one speaker is speaking, the transcript output stream 112 should include no CC symbols and the transcript formatter 116 lists out the words and/or symbols of the transcript output stream 112 in a line or other grouping, but as soon as a CC symbol is included, the transcript formatter 116 splits the associated words into the two virtual channels, preventing the overlapping words from becoming confusing and/or unintelligible.

In some examples, the system 100 is configured to receive or obtain the multi-speaker audio stream 102 in real-time or near-real-time and to generate a transcript 118 in real-time or near-real-time. Because the transcript generator model 110 is configured to insert the CC symbols into the transcript output stream 112 in the same manner that the model 110 includes other words or symbols into the transcript output stream 112, the process of splitting words separated by CC symbols into two channel groupings to format the transcript 118 can be performed quickly and efficiently, enabling the resulting transcript 118 to be of use in real-time (e.g., during the conversation from which it was generated).

Figure 2:
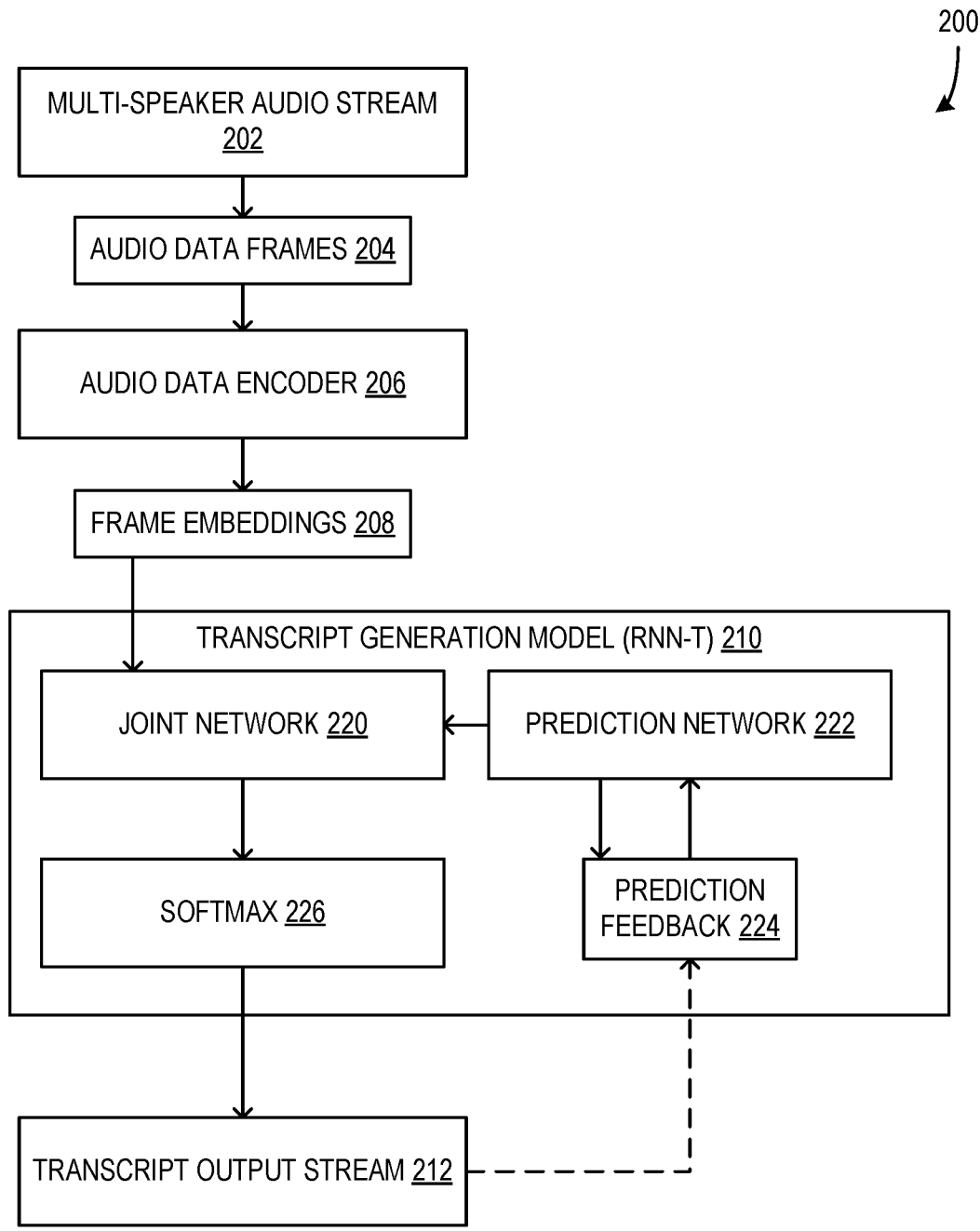
FIG. 2 is a block diagram illustrating a system of FIG. 1 wherein the transcription generation model is a Recurrent Neural Network Transducer (RNN-T)

FIG. 2 is a block diagram illustrating a system 200 of FIG. 1 wherein the transcription generation model 210 is a Recurrent Neural Network Transducer (RNN-T). In some examples, the multi-speaker audio data stream 202, the audio data frames 204, the audio data encoder 206, the frame embeddings 208 and the transcript output stream 212 are substantially equivalent to the corresponding components described above with respect to FIG. 1.

The RNN-T 210 includes a joint network 220, a prediction network 222 that uses prediction feedback 224, and a SoftMax component 226 that are used together to generate the transcript output stream 212 from the frame embeddings 208.

The joint network 220 is configured to receive a current frame embedding 208 and predicted output from the prediction network 222 and combine them into a single output that is provided to the SoftMax 226. In this example, the frame embeddings 208 from the encoder 206 act as an acoustics-based portion of the input into the joint network 220. The prediction network 222 is configured to provide output to the joint network 220 that is predictive of the next words or symbols based on the words or symbols that have been predicted previously in the prediction feedback 224. Further, in some examples, the prediction feedback 224 is provided, at least in part, from the words and symbols of the transcript output stream 212. The output of the prediction network 222 acts as a language-based portion of the input into the joint network 220.

The output of the joint network 220, which includes aspects of both the frame embeddings 208 and the output from the prediction network 222, is provided to the SoftMax 226, which generates a probability distribution over the set of possible output symbols (e.g., words, the CC symbol, or the like). These probability distributions are mapped to the words and symbols with which the transcript generation model 210 was trained and output as the transcript output stream 212. In some examples, the transcript output stream is then formatted as described herein with respect to the transcript formatter 116 of FIG. 1.

In other examples, other types of end-to-end streaming ASR models are used in place of the RNN-T 210 without departing from the description (e.g., a Connectionist Temporal Classification model or a Transformer Transducer model).

Figure 3:
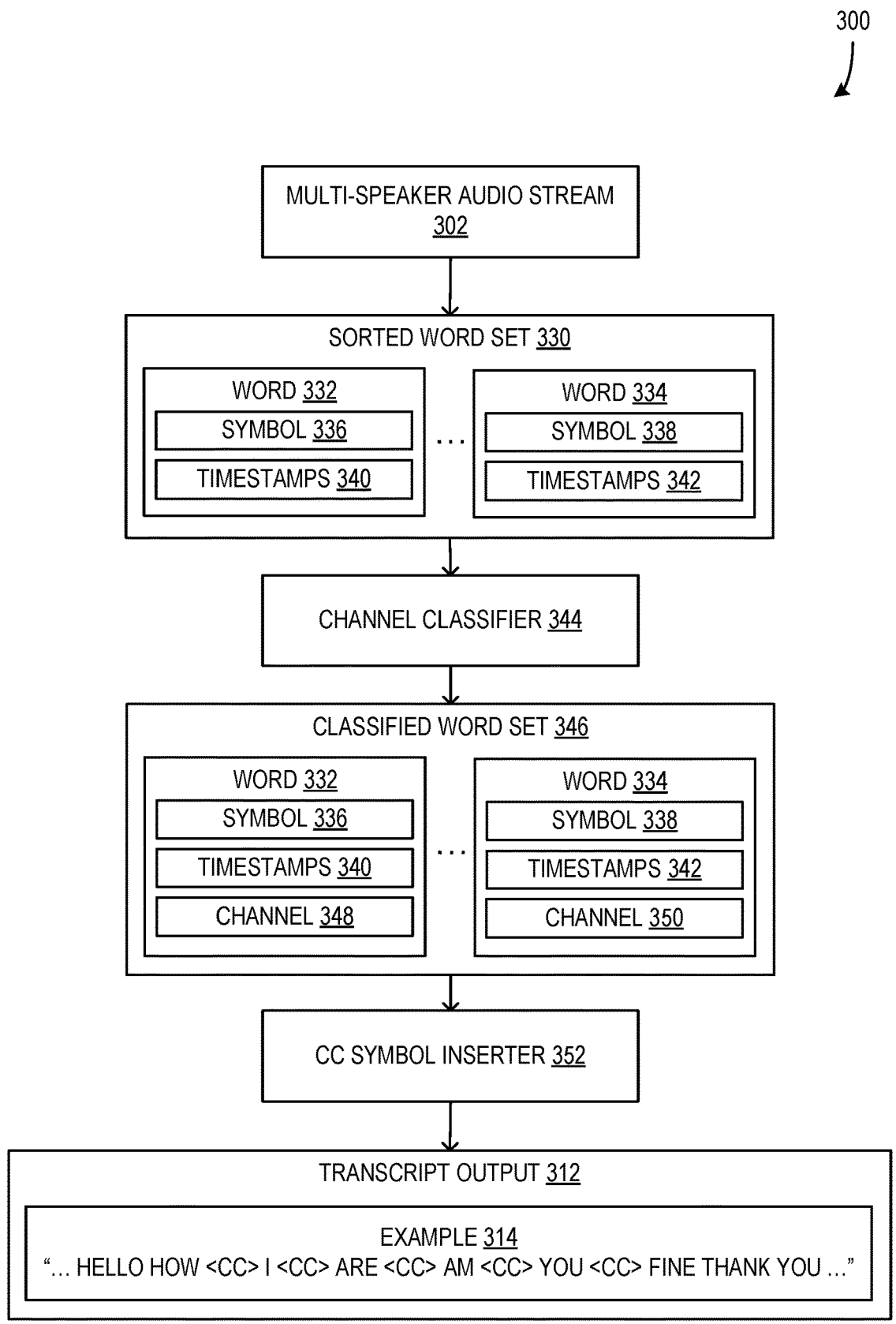
FIG. 3 is a block diagram illustrating a system configured to generate training data for training the transcript generation model of FIGS. 1 and 2.

FIG. 3 is a block diagram illustrating a system 300 configured to generate training data (e.g., transcript output 312) for training the transcript generation model (e.g., transcript generation model 110) sometimes in conjunction with audio data encoder (e.g., audio data encoder 106) of FIGS. 1 and 2. In some examples, the system 300 is used prior to the system 100 of FIG. 1 to train the transcript generation model 110 therein.

The input to system 300 includes a multi-speaker audio stream 302 and an associated sorted word set 330. The sorted word set 330 includes the words 332-334 (data objects including metadata as described herein) and each of the words 332-334 includes associated symbols 336-338 and timestamps 340-342. The sorted word set 330 may include the speaker identity information of each word, and/or the original audio stream identifier if the multi-speaker audio stream is generated by mixing two or more single-speaker audio streams as described herein. The symbols 336-338 of the words 332-334 are values that are indicative of the specific words (e.g., a word 332 includes a symbol 336 value associated with the word "the"). The timestamps 340-342 are values indicative of the time interval when the word was spoken in the multi-speaker audio stream 302 (e.g., a start timestamp and an end timestamp). In some examples, the words 332-334 of the sorted word set 330 are sorted according to timestamps 340-342 such as end timestamps, such that words with earlier end timestamps are earlier in the sorted word set 330 than words with later end timestamps.

Further, in some examples, the sorted word set 330 input to the system 300 is generated by manual annotation. Alternatively, two or more single-speaker audio streams are combined into the multi-speaker audio stream 302 and word sets of the two or single-speaker audio streams are obtained using an ASR process and combined into a sorted word set 330. In such examples, the single-speaker audio streams are captured from speakers in a single conversation (e.g., each speaker is speaking into a separate microphone such that audio from the different microphone channels can be isolated into single-speaker audio streams) and/or from speakers that are not sharing a conversation (e.g., single-speaker audio streams pulled from different contexts and/or situations which are overlaid over each other to form multi-speaker audio stream 302 for use in training a model).

The sorted word set 330 is provided to the channel classifier 344, which is configured to classify each word of the sorted word set 330 into channels, resulting in a classified word set 346 in which the words 332-334 include respective channels 348-350. In some examples, the channel classifier 344 analyzes the timestamps 340-342 of the words 332-334 and identifies words that have overlapping timeframes. Words that overlap in this way, words that are uttered by different speakers, and/or words that are uttered in different original audio streams before mixing if the multi-speaker audio stream 302 is generated by two or more single-speaker audio streams, are classified into different channels. For instance, in an example where word 332 and word 334 have overlapping timeframes, word 332 is classified in channel one such that the channel 348 value is set to '1' and word 334 is classified in channel two such that the channel 350 value is set to '2'. In some examples, only two channels are used, but in other examples, more than two channels are used such that the speech of more than two overlapping speakers can be processed.

Additionally, or alternatively, words in the sorted word set 330 that do not overlap with any other words are classified as the same channel as an adjacent word in the set (e.g., the word immediately preceding it). In some examples, the channel classifier 344 starts with the first word of the sorted word set 330 and classifies that first word as a first channel. The following words are also classified as the first channel until overlapping words are detected, at which point, the overlapping words are split into two channels as described herein. The channel classifier 344 is configured to iterate through the sorted word set 330 in this way to create the classified word set 346.

The classified word set 346 is provided to the CC symbol inserter 352. The CC symbol inserter 352 is configured to identify adjacent words with different channels in the classified word set 346 and to insert a CC symbol between them to form the transcript output 312 (e.g., see the example output 314).

Additionally, or alternatively, the system 300 is configured to perform the described operations on a stream of data in real-time or near-real-time, such that the sorted word set 330 is a stream of sorted words that are classified by the channel classifier 344. The stream of classified words from the channel classifier 344 is processed by the CC symbol inserter 352, such that the output stream of words includes CC symbols between those words classified in different channels.

In some examples, the system 300 performs the described process automatically and the transcript output 312 is stored together with the matching multi-speaker audio stream 302 as training data for use in training a transcript generation model 110 and/or 210 sometimes in conjunction with audio data encoder 106 and/or 206 as described above with respect to FIGS. 1 and 2.

Figure 4:
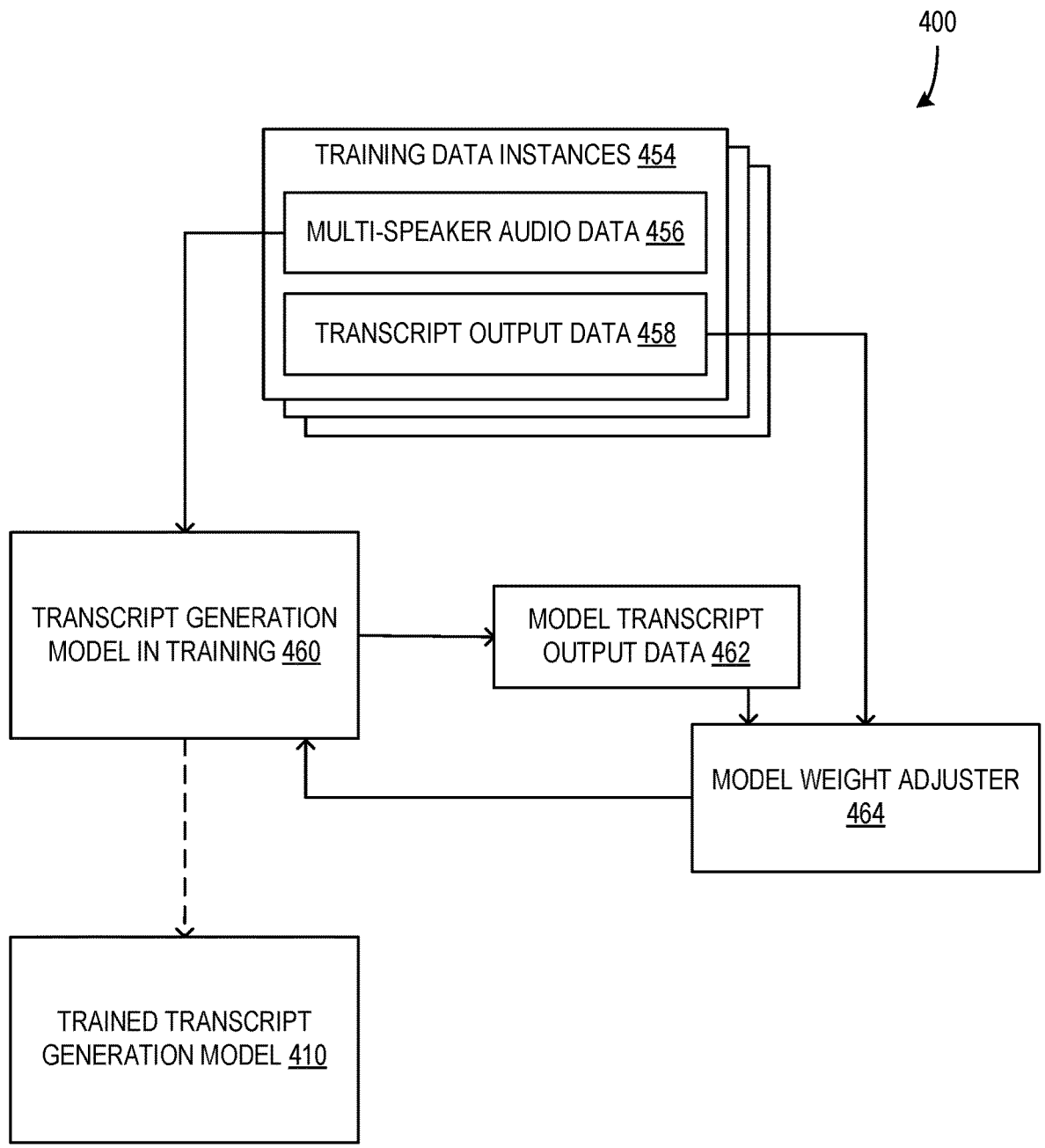
FIG. 4 is a block diagram illustrating a system for training a transcript generation model.

FIG. 4 is a block diagram illustrating a system 400 configured for training a transcript generation model 410. In some examples, the trained transcript generation model 410 is then used in a system such as systems 100 and/or 200 of FIGS. 1 and/or 2, respectively. In some examples, the system 400 is configured to train a transcript generation model in training 460 using training data instances 454 via machine learning techniques.

In such examples, the training instances 454 each include multi-speaker audio data 456 and associated transcript output data 458. It should be understood that the transcript output data 458 of an instance 454 is the desired output of the model being trained when given the multi-speaker audio data 456 as input. To train the model in training 460, the multi-speaker audio data 456 of a training data instance 454 is provided to the model in training 460 and the model 460 generates model transcript output data 462. That model transcript output data 462 is provided with the transcript output data 458 to a model weight adjuster 464 of the system 400.

The model weight adjuster 464 is configured to compare the transcript output data 458 with the model transcript output data 462 and to perform adjustments to weights and/or other parameters of the model in training 460 based on the differences between the output data 462 and the output data 458. In some examples, the model weight adjuster 464 is configured to adjust the model in training 460 in such a way that future model transcript output data 462 is more similar to the expected transcript output data 458. The result is a feedback loop that improves the accuracy and/or efficiency of the model in training 460.

Further, in some examples, the system 400 is configured to train the model in training 460 using a plurality of training data instances 454, including adjusting the weights and/or parameters of the model in training 460 after the processing of each instance 454. By using many different training data instances 454, the model in training 460 is trained to generate transcript output data more accurately in general. Additionally, or alternatively, the system 400 is configured to train the model in training 460 on multiple training data instances 454 several times during the training process. Each round, or epoch (e.g., a period of training during which the model 460 is trained on each training data instance 454 once), of training further improves the performance of the model in training 460.

In some examples, the training process of the model in training 460 includes a defined quantity of training epochs. Additionally, or alternatively, the performance of the model in training 460 is observed during each epoch and, based on detecting that the model in training 460 consistently generates accurate model transcript output data 462, the training process is ended and the model in training 460 becomes a trained transcript generation model 410. In some examples, such a trained model 410 is then used to generate transcript output from a multi-speaker audio stream as described herein.

Further, in some examples, the training data instances 454 are created from the multi-speaker audio data 456 of existing meetings or conversations. Such audio data 456 is analyzed to determine the words being spoken and the timestamps of those words and that information is used to generate accurate transcript output data 458 (e.g., via a system such as system 300 of FIG. 3). Additionally, or alternatively, in some examples, training data instances 454 are created from combining multiple audio streams of people speaking, such that the words spoken in the multiple audio streams overlap. Creating training data instances 454 in this manner substantially expands the available quantity and variability of the training data since any portion of audio data of a person speaking can be overlapped with any other portion of audio data of another person speaking.

In other examples, other processes and/or machine learning methods of training the model in training 460 into a trained transcript generation model 410 are used without departing from the description.

Figure 5:
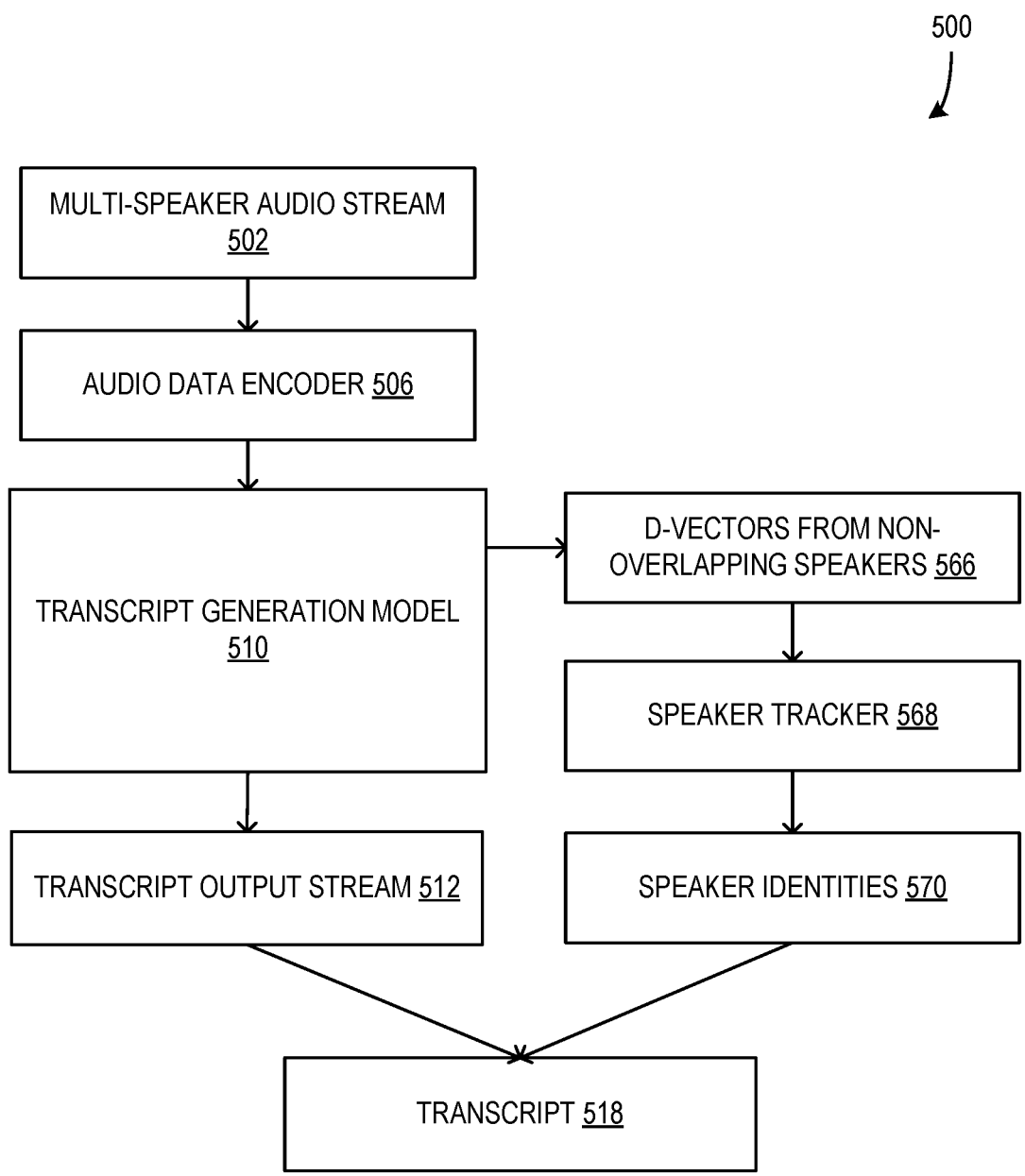
FIG. 5 is a block diagram illustrating a system configured to generate a transcript with tracked speaker identities from a multi-speaker audio stream.

FIG. 5 is a block diagram illustrating a system 500 configured to generate a transcript 518 with tracked speaker identities 570 from a multi-speaker audio stream 502. In some examples, the system 500 includes an audio data encoder 506 and a transcript generation model 510 that generate a transcript output stream 512 based on a multi-speaker audio stream 502 in a substantially equivalent way as described above with respect to systems 100 and/or 200 of FIGS. 1 and/or 2, respectively.

The system 500 is configured to extract d-vectors (e.g., vectors representing speaker characteristic generated as activation values of another neural network that is trained to estimate or discriminate speaker identity) from non-overlapping speakers 566 during the analysis of the multi-speaker audio stream 502. D-vectors 566 are averaged activation values of non-overlapping speaker regions estimated by the last layer of a neural network of the transcript generation model 510 (e.g., an RNN-T model 210). The d-vectors 566 that are extracted from data associated with non-overlapping words of the multi-speaker audio stream 502 are used by a speaker tracker 568 to identify and track the identities of speakers in the audio stream 502. Such d-vectors 566 can be compared with each other (e.g., a d-vector from one non-overlapping speaker portion compared to a d-vector from another non-overlapping speaker portion) and the differences identified in those comparisons are used to determine when different people are speaking.

Based on identifying d-vectors 566 that substantially match, the speaker tracker 568 generates and assigns speaker identities 570 to portions of the transcript 518, such that those portions of the transcript 518 are labeled with or otherwise associated with the speaker identities 570. In such examples, the speaker identities 570 are abstractly assigned to speakers (e.g., Speaker 1, Speaker 2, and/or Speaker 3) in the absence of any additional data for assigning more specific speaker identities 570 (e.g., assigning a speaker with their name).

In some examples, in addition to extracting d-vectors 566 from portions of the data associated non-overlapping speakers, the system 500 is configured to extract d-vectors from portions of the data with overlapping speakers for use in tracking speakers by the speaker tracker 568. In such examples, the d-vectors from portions associated with overlapping speakers are weighted or factored less significantly than d-vectors from portions associated with non-overlapping speakers.

Additionally, or alternatively, the transcript generation model 510 is trained and/or configured to insert speaker change symbols (e.g., <SC>) into the transcript output stream 512 in a similar manner to inserting the CC symbols as described herein. In such examples, the SC symbols are used to extract d-vectors 566 from portions of the data that are associated with the SC symbols and tracked by the speaker tracker 568 as described herein.

Further, in some examples, the speaker tracker 568 includes or otherwise has access to speaker profiles of people that include d-vectors from speech of the people that have been pre-recorded and associated with each person's name or other identifier. In such examples, the speaker tracker 568 is configured to compare the d-vectors 566 from the transcript generation model 510 to the speaker profiles. The speaker tracker 568 is further configured to assign speaker identities 570 that include the names and/or other identifiers of the speaker profiles to portions of the transcript 518 as described herein (e.g., a line of text in the transcript 518 is labeled with the name 'Anita' based on extracted d-vectors 566 that substantially match d-vectors of a speaker profile for Anita).

Figure 6:
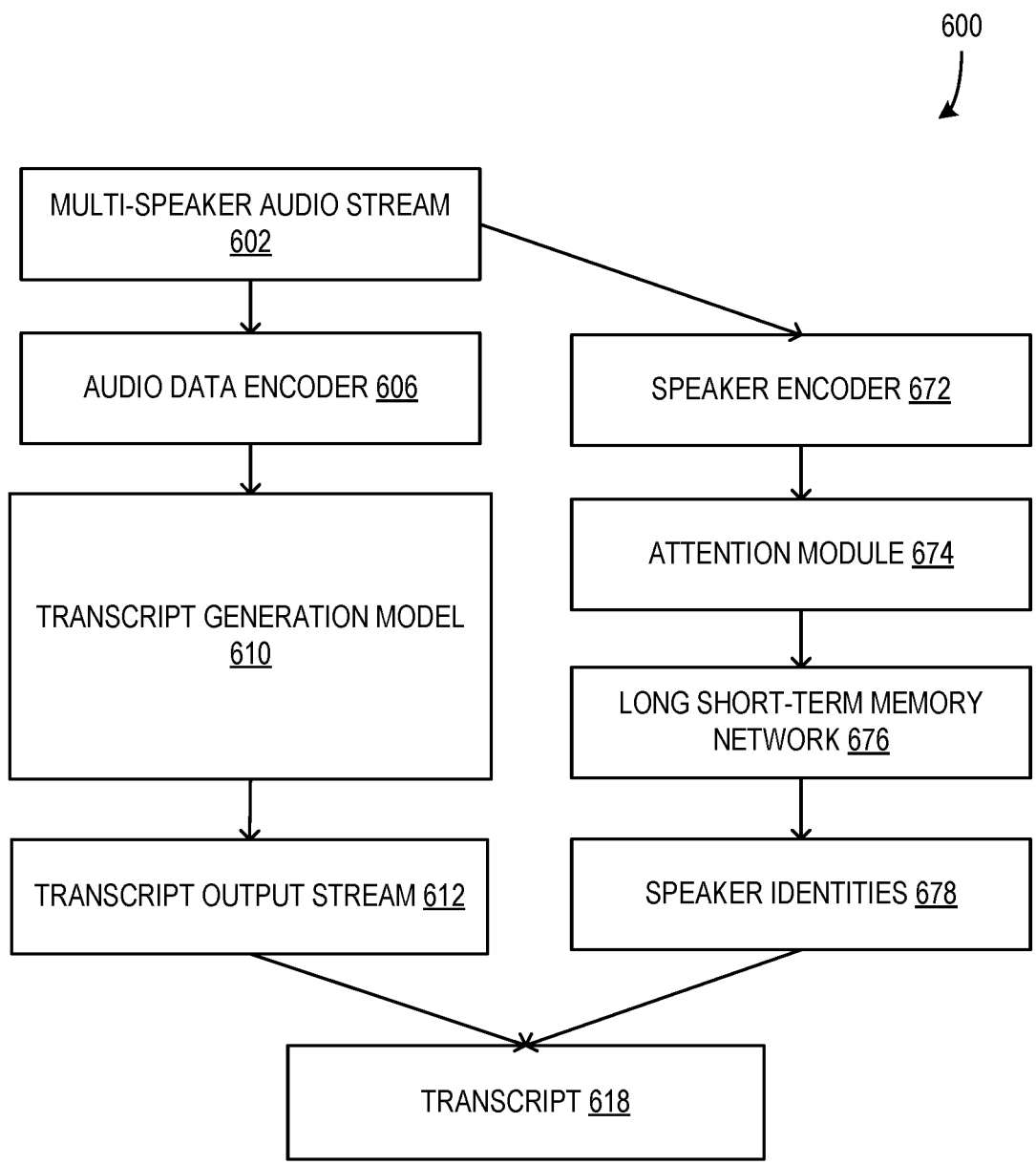
FIG. 6 is a block diagram illustrating a system configured to use two parallel models to generate a transcript with tracked speaker identities from a multi-speaker audio stream.

FIG. 6 is a block diagram illustrating a system 600 configured to use two parallel models 610 and 674-676 to generate a transcript 618 with tracked speaker identities from a multi-speaker audio stream 602. In some examples, the system 600 includes an audio data encoder 606 and a transcript generation model 610 that generate a transcript output stream 612 based on a multi-speaker audio stream 602 in a substantially equivalent way as described above with respect to systems 100 and/or 200 of FIGS. 1 and/or 2, respectively.

Further, the system 600 includes a speaker encoder 672, an attention module 674, and a long short-term memory (LSTM) network 676 that are configured to generate speaker identities 678 from the multi-speaker audio stream 602. Those speaker identities 678 are assigned to portions of the transcript 618 as described above with respect to speaker identities 570 of FIG. 5.

The speaker encoder 672 is configured to generate embeddings from the multi-speaker audio stream 602 that reflect aspects of the audio data that can be used to identify the speakers. The embeddings from the speaker encoder 672 are provided to the attention module 674.

The attention module 674 is a trained network that is configured to generate a query based on an embedding from the speaker encoder 672, a context vector from previous query generation, and a relative time difference since the previous query generation. The attention module 674 generates a context vector based on an attention weighted sum of the embedding from the speaker encoder 672, where the attention weight is estimated using the generated query.

The generated context vector is provided to the LSTM network 676. The LSTM network 676 is trained to generate a speaker embedding based on the provided context vector. The speaker embeddings generated by the LSTM network 676 associated with portions of the audio stream that include channel changes and/or speaker changes are compared with each other and/or speaker profiles (e.g., as described above with respect to the speaker tracker 568 and the speaker identities 570) to generate the speaker identities 678, which are assigned to and/or otherwise associated with portions of the transcript 618.

Figure 7:
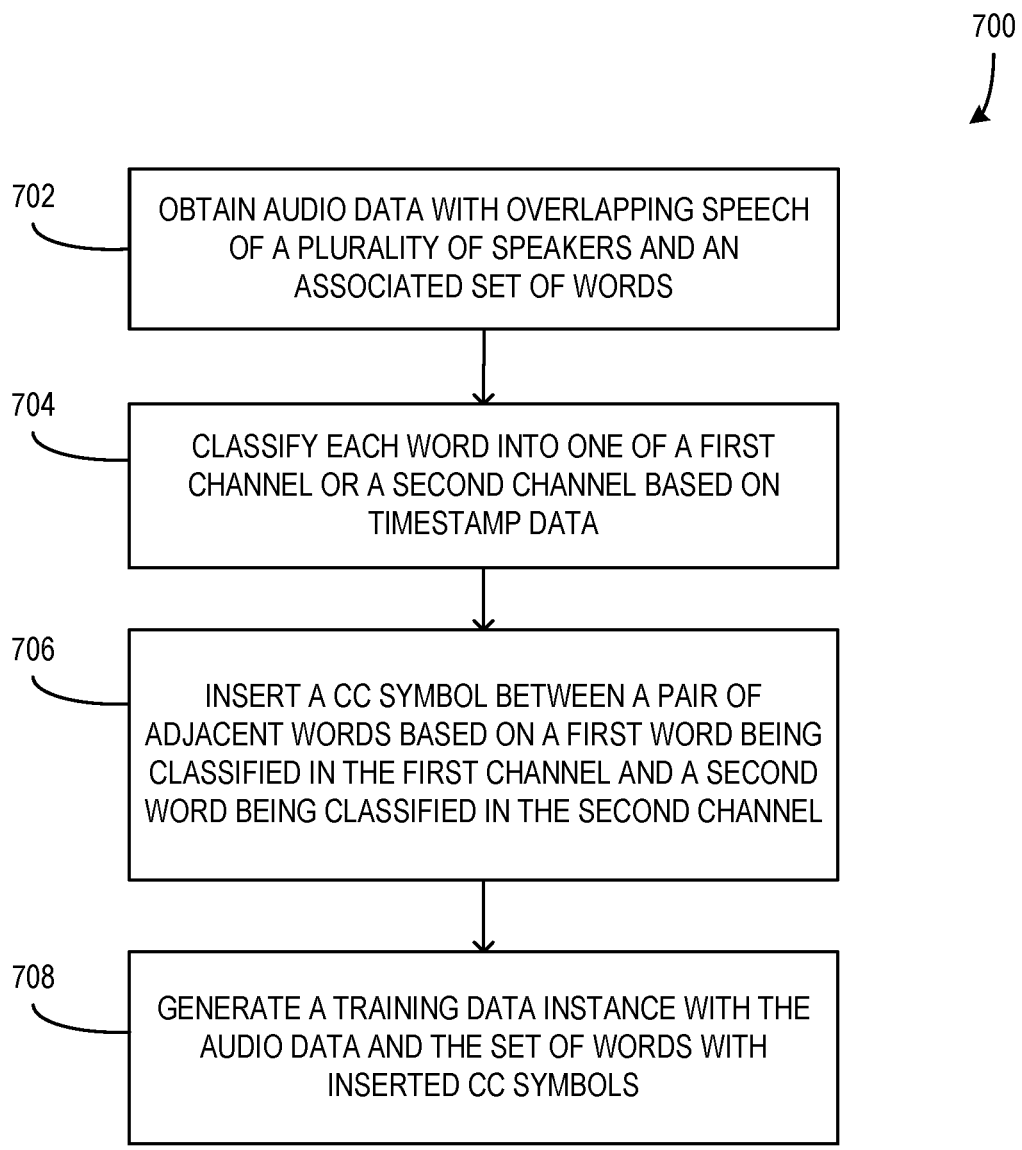
FIG. 7 is a flowchart illustrating a computerized method for generating training data for training a transcript generation model.

FIG. 7 is a flowchart illustrating a computerized method 700 for generating training data for training a transcript generation model. In some examples, the computerized method 700 is executed or otherwise performed by a system such as system 300 of FIG. 3. At 702, audio data with overlapping speech of a plurality of speakers is obtained with an associated set of words (e.g., a sorted word set 330). In some examples, the obtained audio data is an audio stream of two or more speakers whose speech sometimes overlaps.

In some examples, the set of words includes timestamp data for each word (e.g., a start timestamp indicative of a time when the beginning of the word was spoken and/or an end timestamp indicative of a time when the end of the word was spoken). In other examples, the timestamp data includes a time length value (e.g., a word with a start timestamp value and a time length value indicative of the length of time during which the word was spoken). In other examples, the timestamp data includes speaker identity information for each word in the set of words. In still other examples, if the audio data with overlapping speech is generated by mixing two or more single-speaker audio streams, the timestamp data includes the information to identify the original single speakers before mixing. Further, in some examples the set of words is sorted based on their respective timestamps (e.g., sorting the words in order chronologically based on a start timestamp, an end timestamp, and/or a center point between a start timestamp and an end timestamp).

At 704, each word of the set of words is classified into one of a first channel or a second channel based on timestamp data of the words. The channels are abstract channels used during the method 700 to keep words of different speakers separate, enabling the generation of a coherent transcript. In some examples, the words are classified such that a first word of the set of words that overlaps with a second word of the set of words is classified into a separate channel from the second word. In such examples, words overlap when the timestamp data of the words indicates an overlap (e.g., the time range associated with start and end timestamps of a first word occupies at least a portion of the same time as the time range associated with start and end timestamps of a second word).

Additionally, or alternatively, in some examples, classifying each word of the set of words into one of a first channel or a second channel based on the timestamp data includes selecting a first word of the set of words and, based on the timestamp data of the first word indicating that the first word is a non-overlapping word, the first word is classified into the first channel. Alternatively, based on the timestamp data of the first word indicating that the first word overlaps with a subsequent word in the set of words, the first word is classified into the first channel and the subsequent word into the second channel. Further alternatively, based on the timestamp data of the first word indicating that the first word has different speaker identity to the second word, the first word is classified into the first channel and the subsequent word into the second channel. Further, if the timestamp data of the first word indicates that the first word is originated from the different non-overlapping speech than that the second word in examples where single-speaker audio streams are mixed, the first word is classified into the first channel and the subsequent word into the second channel.

At 706, a channel change symbol, or CC symbol, is inserted between a pair of adjacent words based on a first word of the pair being classified in the first channel and a second word of the pair being classified in the second channel. Further, in some examples, more than one CC symbol is used to enable the method 700 to handle more than two overlapping words. For instance, in an example, three CC symbols (e.g., <CC1>, <CC2>, and <CC3>) are used and, when three words overlap in the set of words, each of the overlapping words is classified into one of CC1, CC2, or CC3. Associated CC symbols are inserted into the set of words between the overlapping words such that the symbol preceding the word is indicative of the channel into which the word has been classified (e.g., "<CC2> the" would indicate that 'the' is classified in channel 2). In other examples, more and/or different CC symbols are used to indicate overlapping speech without departing from the description.

At 708, the set of words with inserted CC symbols and the audio data are used to generate a training data instance (e.g., a training data instance 454). In some examples, the generated training data instance is used with a set of other training data instances to train a transcript generation model sometimes in conjunction with audio data encoder as described herein.

Figure 8:
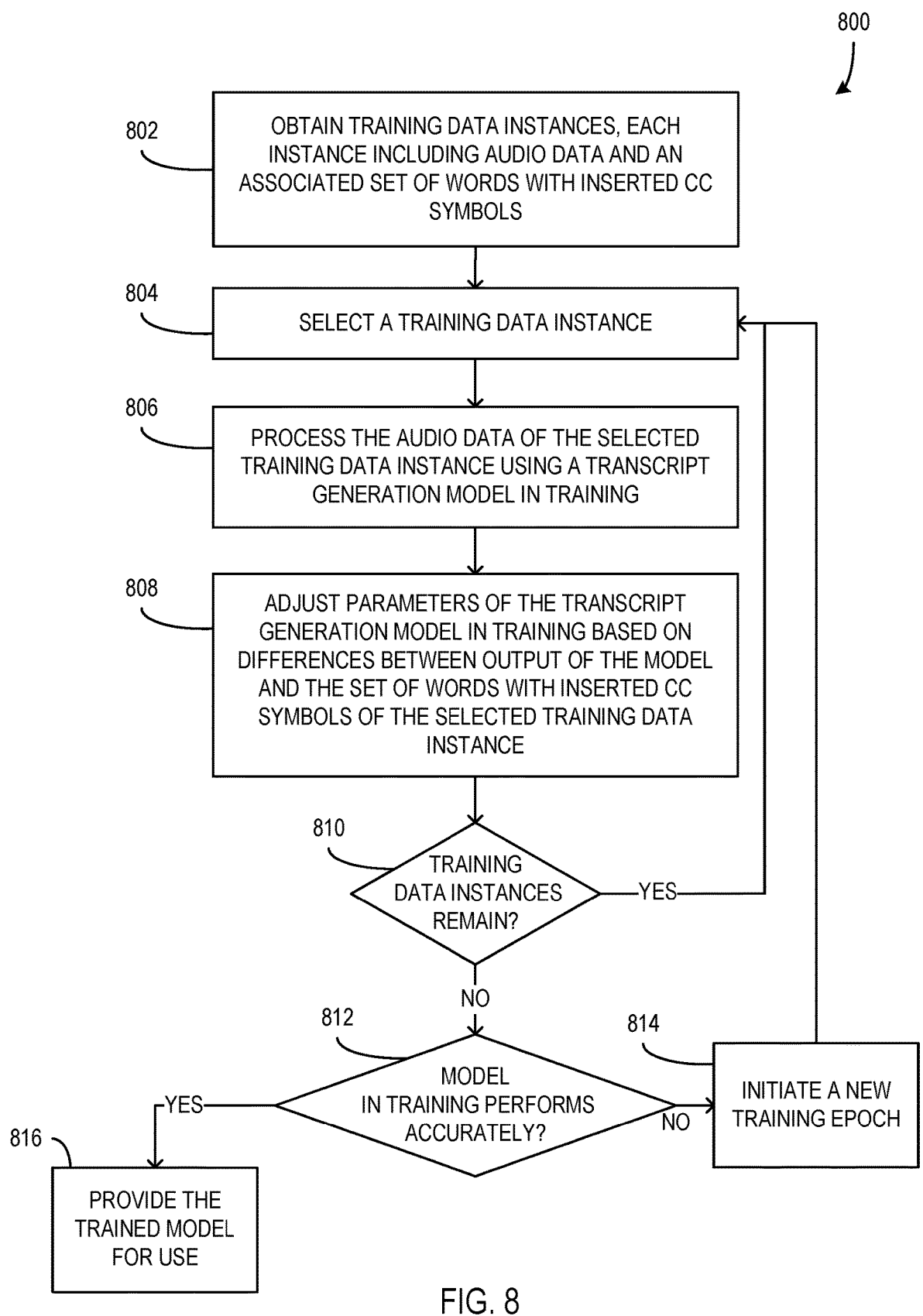
FIG. 8 is a flowchart illustrating a computerized method for training a transcript generation model.

FIG. 8 is a flowchart illustrating a computerized method 800 for training a transcript generation model. In some examples, the method 800 is executed or otherwise performed on a system such as system 400 of FIG. 4. At 802, training data instances are obtained. The training data instances include audio data and an associated set of words with inserted CC symbols (e.g., training data instances 454).

At 804, a training data instance from the obtained training data instances is selected and, at 806, the audio data of the selected training data instance is processed using a transcript generation model in training (e.g., model 460).

At 808, the parameters of the transcript generation model in training are adjusted based on differences between the output of the model and the set of words with inserted CC symbols of the selected training data instance. In some examples, the parameters of the model in training are adjusted in such a way that the accuracy of the model for generating output similar to the set of words of the selected training data instance is improved.

At 810, if training data instances remain to be processed, the process returns to 804 to select another training data instance. Alternatively, if no training data instances remain at 810, the process proceeds to 812.

At 812, if the model in training is not performing accurately enough (e.g., the accuracy of its output when compared to the sets of words of the training data instances does not reach a defined threshold), the process proceeds to 814. Alternatively, if the model in training is performing accurately enough, the process proceeds to 816.

At 814, a new training epoch is initiated, such that the process begins to train the transcript generation model on the training data instances again. The process returns to 804 to select a training data instance. Further, in some examples, the training data instances used to train the model include more, fewer, or different training data instances without departing from the description.

At 816, the trained model is provided for use. In some examples, the trained model is used as a transcript generation model (e.g., transcript generation model 110) in a system such as system 100 of FIG. 1.

Further, in some examples, the trained model transcript generation model is at least one of the following: a connectionist temporal classification model, a recurrent neural network transducer (RNN-T), and a transformer transducer.

Figure 9:
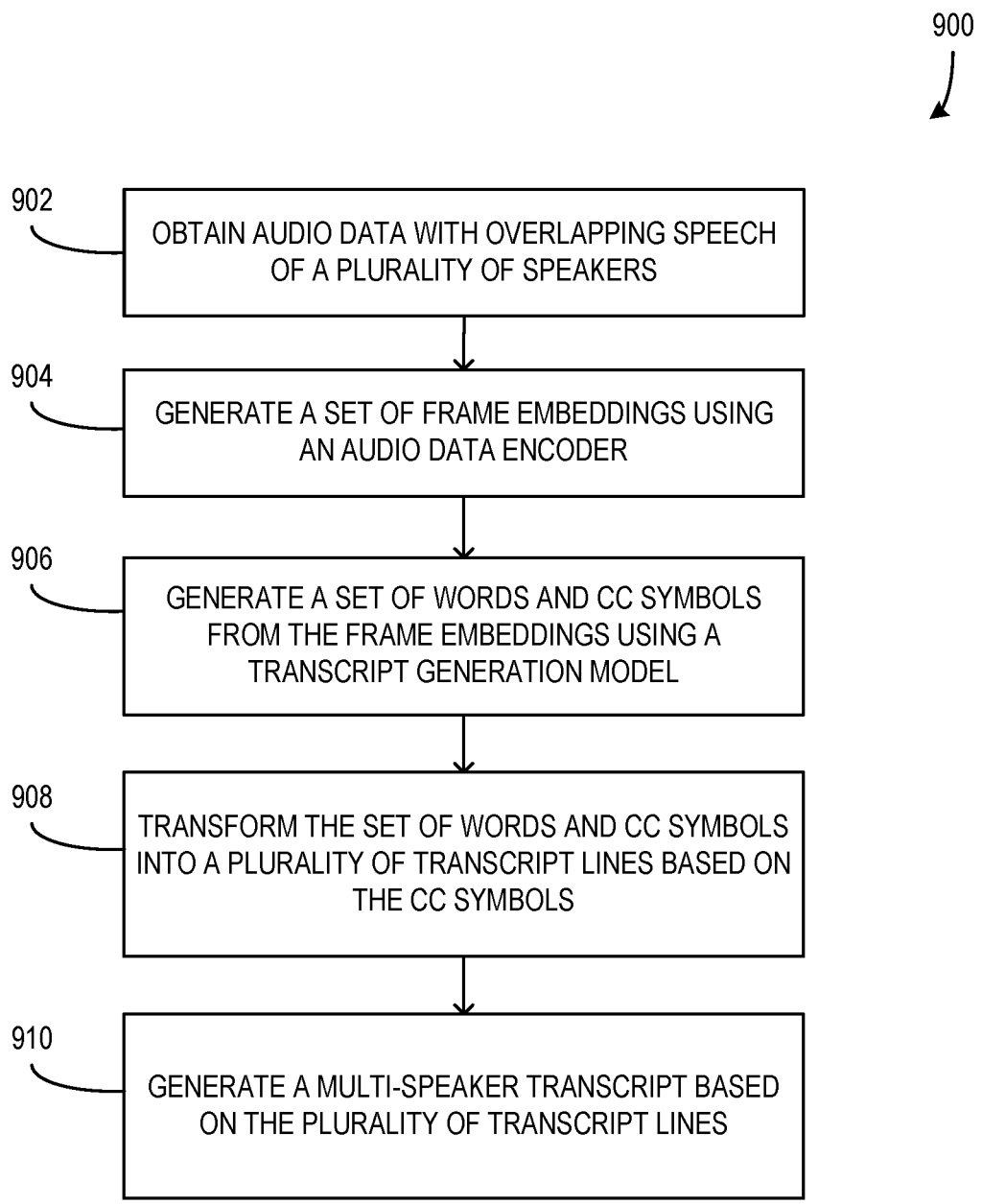
FIG. 9 is a flowchart illustrating a computerized method for generating a transcript from a multi-speaker audio stream with a transcript generation model.

FIG. 9 is a flowchart illustrating a computerized method 900 for generating a transcript 118 from a multi-speaker audio stream 102 with a transcript generation model 110. In some examples, the computerized method 900 is executed or otherwise performed by a system such as systems 100 and 200 of FIGS. 1 and 2, respectively. At 902, audio data with overlapping speech of a plurality of speakers is obtained and, at 904, a set of frame embeddings (e.g., frame embeddings 108) is generated using an audio data encoder (e.g., audio data encoder 106).

At 906, a set of words and CC symbols (e.g., a transcript output stream 112) are generated from the frame embeddings using a transcript generation model 110. In some examples, the transcript generation model 110 is an RNN-T 210 as described herein.

At 908, the set of words and CC symbols are transformed into a plurality of transcript lines based on the CC symbols and, at 910, a multi-speaker transcript is generated based on the plurality of transcript lines. In some examples, the set of words and CC symbols are transformed into a multi-speaker transcript by a transcript formatter 116 as described herein.

Figure 10:
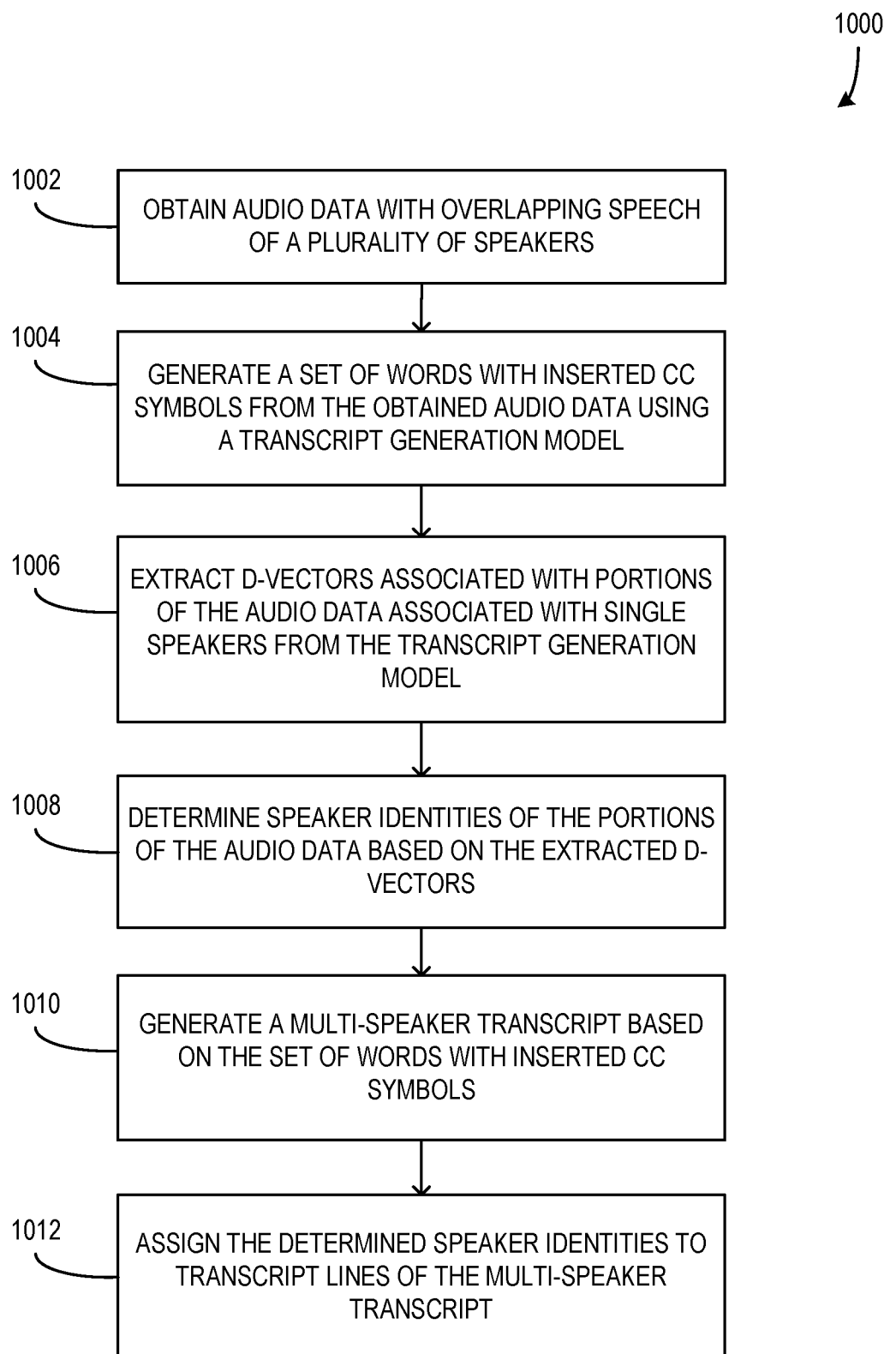
FIG. 10 is a flowchart illustrating a computerized method for generating a transcript with tracked speaker identities from a multi-speaker audio stream.

FIG. 10 is a flowchart illustrating a computerized method 1000 for generating a transcript with tracked speaker identities from a multi-speaker audio stream. In some examples, the computerized method 1000 is executed or otherwise performed on a system such as systems 500 and/or 600 of FIGS. 5 and/or 6.

At 1002, audio data with overlapping speech of a plurality of speakers is obtained and, at 1004, a set of words with inserted CC symbols is generated from the obtained audio data using a transcript generation model. In some examples, the processes of 1002 and 1004 are performed in a substantially equivalent way as described above with respect to systems 100 and/or 200 of FIGS. 1 and/or 2.

At 1006, d-vectors are extracted from the neural network that is trained to estimate or discriminate between speakers. The extracted d-vectors are associated with portions of the audio data that include single speakers or otherwise non-overlapping speech that is estimated from the output of the transcript generation model. In some examples, the d-vectors include values, features, and/or patterns that differ based on the person speaking during the portion of the audio data.

At 1008, speaker identities of those portions of the audio data are determined based on the extracted d-vectors. In some examples, the identified speaker identities are generic (e.g., Speaker 1 and Speaker 2) and they are determined based on comparison of the d-vectors with each other. D-vector instances that are sufficiently similar to each other are determined to be associated with one speaker identity, while two d-vector instances that are not sufficiently similar are determined to be associated with two different speaker identities.

Additionally, or alternatively, in some examples, the identified speaker identities are specific (e.g., associated with a speaker's name or other identifier) and they are determined based on comparison of the extracted d-vectors to previously created speaker profiles. Such speaker profiles include specific identity information of a speaker associated with at least one reference d-vector to which extracted d-vectors can be compared. When an extracted d-vector is sufficiently similar to a d-vector of a speaker profile, it is determined that the extracted d-vector is associated with the identity of the speaker profile (e.g., the portion of the audio data was spoken by the speaker of the speaker profile).

At 1010, a multi-speaker transcript is generated based on the set of words with the inserted CC symbols. In some examples, this process is performed in a substantially equivalent way as the process described with respect to the transcript formatter 116 of FIG. 1.

At 1012, the determined speaker identities are assigned to transcript lines of the multi-speaker transcript. In some examples, the speaker identities are used to label the lines of the multi-speaker transcript and/or other subsets or portions of the multi-speaker transcript.

Exemplary Operating Environment

Figure 11:
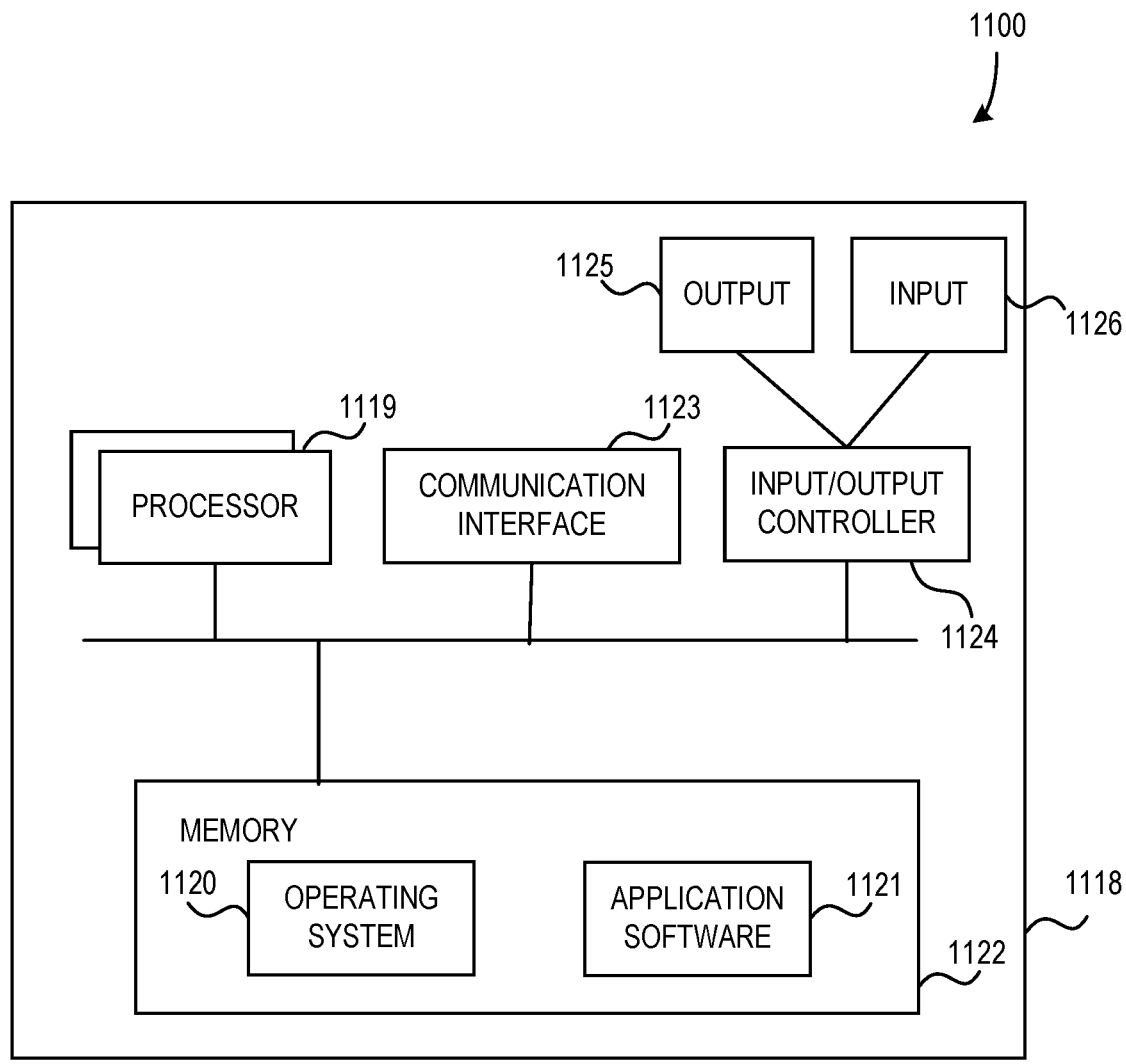
FIG. 11 illustrates an example computing apparatus as a functional block diagram.

The present disclosure is operable with a computing apparatus according to an embodiment as a functional block diagram 1100 in FIG. 11. In an example, components of a computing apparatus 1118 are implemented as a part of an electronic device according to one or more embodiments described in this specification. The computing apparatus 1118 comprises one or more processors 1119 which may be microprocessors, controllers, or any other suitable type of processors for processing computer executable instructions to control the operation of the electronic device. Alternatively, or in addition, the processor 1119 is any technology capable of executing logic or instructions, such as a hard-coded machine. In some examples, platform software comprising an operating system 1120 or any other suitable platform software is provided on the apparatus 1118 to enable application software 1121 to be executed on the device. In some examples, training and using a transcript generation model to generate transcripts of multi-speaker audio streams as described herein is accomplished by software, hardware, and/or firmware.

In some examples, computer executable instructions are provided using any computer-readable media that are accessible by the computing apparatus 1118. Computer-readable media include, for example, computer storage media such as a memory 1122 and communications media. Computer storage media, such as a memory 1122, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1122) is shown within the computing apparatus 1118, it will be appreciated by a person skilled in the art, that, in some examples, the storage is distributed or located remotely and accessed via a network or other communication link (e.g., using a communication interface 1123).

Further, in some examples, the computing apparatus 1118 comprises an input/output controller 1124 configured to output information to one or more output devices 1125, for example a display or a speaker, which are separate from or integral to the electronic device. Additionally, or alternatively, the input/output controller 1124 is configured to receive and process an input from one or more input devices 1126, for example, a keyboard, a microphone, or a touchpad. In one example, the output device 1125 also acts as the input device. An example of such a device is a touch sensitive display. The input/output controller 1124 may also output data to devices other than the output device, e.g., a locally connected printing device. In some examples, a user provides input to the input device(s) 1126 and/or receive output from the output device(s) 1125.

The functionality described herein can be performed, at least in part, by one or more hardware logic components. According to an embodiment, the computing apparatus 1118 is configured by the program code when executed by the processor 1119 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: at least one processor; and at least one memory comprising computer program code, the at least one memory and the computer program code configured to, with the at least one processor, cause the at least one processor to: obtain audio data including overlapping speech of a plurality of speakers; generate a set of frame embeddings from audio data frames of the obtained audio data using an audio data encoder; generate a set of words and channel change (CC) symbols from the set of frame embeddings using a transcript generation model, wherein the CC symbols are included between pairs of adjacent words that are spoken by different people at the same time; transform the set of words and CC symbols into a plurality of transcript lines, wherein words of the set of words are sorted into transcript lines based on the CC symbols; and generate a multi-speaker transcript based on the plurality of transcript lines.

An example system comprises: at least one processor; and at least one memory comprising computer program code, the at least one memory and the computer program code configured to, with the at least one processor, cause the at least one processor to: obtain audio data including overlapping speech of a plurality of speakers; generate a set of words from the obtained audio data using an automatic speech recognition (ASR) model, wherein each word of the set of words includes timestamp data and the set of words is sorted based on the timestamp data; classify each word of the set of words into one of a first channel or a second channel based on the timestamp data, wherein a first word of the set of words that overlaps with a second word of the set of words is classified into a separate channel from the second word; insert a channel change (CC) symbol between a pair of adjacent words of the set of words based on a first word of the pair of adjacent words being classified into the first channel and a second word of the pair of adjacent words being classified into the second channel; transform the set of words with inserted CC symbols into a plurality of transcript lines, wherein words of the set of words are sorted into transcript lines based on the inserted CC symbols; and generate a multi-speaker transcript based on the plurality of transcript lines.

An example computerized method comprises: obtaining, by a processor, audio data including overlapping speech of a plurality of speakers; generating, by the processor, a set of frame embeddings from audio data frames of the obtained audio data using an audio data encoder; generating, by the processor, a set of words and channel change (CC) symbols from the set of frame embeddings using a transcript generation model, wherein the CC symbols are included between pairs of adjacent words that have overlapping timestamps in the set of words and CC symbols; transforming, by the processor, the set of words and CC symbols into a plurality of transcript lines, wherein words of the set of words are sorted into transcript lines based on the CC symbols; and generating, by the processor, a multi-speaker transcript based on the plurality of transcript lines.

An example computerized method comprises: obtaining, by a processor, audio data including overlapping speech of a plurality of speakers; generating, by the processor, a set of words from the obtained audio data using an automatic speech recognition (ASR) model, wherein each word of the set of words includes timestamp data and the set of words is sorted based on the timestamp data; classifying, by the processor, each word of the set of words into one of a first channel or a second channel based on the timestamp data, wherein a first word of the set of words that overlaps with a second word of the set of words is classified into a separate channel from the second word; inserting, by the processor, a channel change (CC) symbol between a pair of adjacent words of the set of words based on a first word of the pair of adjacent words being classified into the first channel and a second word of the pair of adjacent words being classified into the second channel; transforming, by the processor, the set of words with inserted CC symbols into a plurality of transcript lines, wherein words of the set of words are sorted into transcript lines based on the inserted CC symbols; and generating, by the processor, a multi-speaker transcript based on the plurality of transcript lines.

One or more computer storage media having computer-executable instructions that, upon execution by a processor, cause the processor to at least: obtain audio data including overlapping speech of a plurality of speakers; generate a set of words from the obtained audio data using an automatic speech recognition (ASR) model, wherein each word of the set of words includes timestamp data and the set of words is sorted based on the timestamp data; classify each word of the set of words into one of a first channel or a second channel based on the timestamp data, wherein a first word of the set of words that overlaps with a second word of the set of words is classified into a separate channel from the second word; insert a channel change (CC) symbol between a pair of adjacent words of the set of words based on a first word of the pair of adjacent words being classified into the first channel and a second word of the pair of adjacent words being classified into the second channel; transform the set of words with inserted CC symbols into a plurality of transcript lines, wherein words of the set of words are sorted into transcript lines based on the inserted CC symbols; and generate a multi-speaker transcript based on the plurality of transcript lines.

One or more computer storage media having computer-executable instructions that, upon execution by a processor, cause the processor to at least: obtain audio data including overlapping speech of a plurality of speakers; generate a set of frame embeddings from audio data frames of the obtained audio data using an audio data encoder; generate a set of words and channel change (CC) symbols from the set of frame embeddings using a transcript generation model, wherein the CC symbols are included between pairs of adjacent words that are spoken by different people at the same time; transform the set of words and CC symbols into a plurality of transcript lines, wherein words of the set of words are sorted into transcript lines based on the CC symbols; and generate a multi-speaker transcript based on the plurality of transcript lines.

Alternatively, or in addition to the other examples described herein, examples include any combination of the following:

wherein classifying each word of the set of words into one of a first channel or a second channel based on the timestamp data includes: selecting a first word of the set of words; based on the timestamp data of the first word indicating that the first word is a non-overlapping word, classifying the first word into the first channel; and based on the timestamp data of the first word indicating that the first word overlaps with a subsequent word in the set of words, classifying the first word into the first channel and the subsequent word into the second channel.

further comprising: combining, by the processor, the obtained audio data and the set of words with inserted CC symbols into a first training data instance; training, by the processor, a transcript generation model to generate sorted sets of words with inserted CC symbols using a machine learning technique with a set of training data instances including the first training data instance; obtaining, by the processor, additional audio data including overlapping speech of a plurality of speakers; generating, by the processor, an additional set of words with inserted CC symbols from the additional audio data using the trained transcript generation model; transforming, by the processor, the additional set of words with inserted CC symbols into an additional plurality of transcript lines, wherein words of the set of words are sorted into transcript lines based on the inserted CC symbols; and generating, by the processor, an additional multi-speaker transcript based on the additional plurality of transcript lines.

wherein the trained transcript generation model is at least one of the following: a connectionist temporal classification model, a recurrent neural network transducer (RNN-T), and a transformer transducer.

wherein classifying, by the processor, each word of the set of words into one of a first channel or a second channel based on the timestamp data further includes classifying each word of the set of words into one of a first channel, a second channel, or a third channel based on the timestamp data, whereby words of the set of words that overlap with two other words are classified into separate channels from the two other words.

further comprising: extracting, by the processor, d-vectors associated with portions of the audio data associated with single speakers from the ASR model; determining, by the processor, speaker identities based on the extracted d-vectors; and assigning, by the processor, the determined speaker identities to transcript lines of the multi-speaker transcript.

wherein determining the speaker identities based on the extracted d-vectors includes: identifying a set of speakers based on differences between the extracted d-vectors, wherein each speaker of the set of speakers is associated with a d-vector of the extracted d-vectors; assigning a generic speaker identity to each speaker of the set of speakers; and wherein the generic speaker identities are assigned to transcript lines of the multi-speaker transcript that are associated with the d-vectors of speakers to which the generic speaker identities are assigned.

wherein determining the speaker identities based on the extracted d-vectors includes: identifying a set of speakers based on comparing the extracted d-vectors to speaker profiles, wherein each speaker profile includes a speaker identity and an associated d-vector; assigning a speaker identity of a speaker profile to each speaker of the set of speakers; and wherein the speaker identities are assigned to transcript lines of the multi-speaker transcript that are associated with the d-vectors of speakers to which the speaker identities are assigned.

wherein the obtained audio data is a real-time audio stream, and the multi-speaker transcript is generated in real-time with respect to the real-time audio stream.

further comprising training the transcript generation model to generate sets of words and CC symbols using a machine learning technique with a set of training data instances, wherein each training data instance includes audio data and an associated set of words and CC symbols.

further comprising: obtaining audio data and an associated set of words, wherein each word of the set of words includes timestamp data and the set of words is sorted based on the timestamp data; classifying each word of the set of words into one of a first channel or a second channel based on the timestamp data, wherein a first word of the set of words that overlaps with a second word of the set of words is classified into a separate channel from the second word; inserting a CC symbol between a pair of adjacent words of the set of words based on a first word of the pair of adjacent words being classified into the first channel and a second word of the pair of adjacent words being classified into the second channel; and combining the set of words and inserted CC symbols into a training data instance of the set of training data instances.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining, by a processor, audio data including overlapping speech of a plurality of speakers; an exemplary means for generating, by the processor, a set of frame embeddings from audio data frames of the obtained audio data using an audio data encoder; an exemplary means for generating, by the processor, a set of words and channel change (CC) symbols from the set of frame embeddings using a transcript generation model, wherein the CC symbols are included between pairs of adjacent words that are spoken by different people at the same time; an exemplary means for transforming, by the processor, the set of words and CC symbols into a plurality of transcript lines, wherein words of the set of words are sorted into transcript lines based on the CC symbols; and an exemplary means for generating, by the processor, a multi-speaker transcript based on the plurality of transcript lines.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    at least one processor; and
    at least one memory comprising computer program code for execution by the at least one processor, the computer program code, when executed by the at least one processor, causing the at least one processor to:
    obtain a single stream of audio data that includes overlapping speech from multiple speakers;
    generate a set of frame embeddings from the single stream of audio data using an audio data encoder;
    generate a set of words and channel change (CC) symbols from the set of frame embeddings using a transcript generation model, wherein the CC symbols are included between pairs of adjacent words that are spoken by different people at the same time;
    transform the set of words and CC symbols into a plurality of transcript lines, wherein words of the set of words are sorted into transcript lines based on the CC symbols; and
    generate a multi-speaker transcript of the single stream of audio data based on the plurality of transcript lines.

2. The system of claim 1, wherein the computer program code further causes the at least one processor to train the transcript generation model to generate a set of words and CC symbols using a machine learning technique with a training data instance.

3. The system of claim 2, wherein the computer program code further causes the at least one processor to:
- classify each word in the set of words into a corresponding channel based on timestamp data associated with the corresponding word;
- insert a CC symbol between a pair of adjacent words in the set of words based on the corresponding channel classifications associated with the pair of adjacent words; and
- combine the set of words and at least the inserted CC symbol into a training data instance of the set of training data instances.

4. The system of claim 1, wherein the computer program code further causes the at least one processor to:
- extract d-vectors associated with portions of the audio data associated with individual speakers from the transcript generation model;
- determine speaker identities based on the extracted d-vectors; and
- assign the determined speaker identities to transcript lines of the multi-speaker transcript.

5. The system of claim 4, wherein the speaker identities are determined based on differences between the extracted d-vectors.

6. The system of claim 4, wherein the speaker identities are determined based on comparing the extracted d-vectors to speaker profiles, each of the speaker profiles including a speaker identity and an associated d-vector.

7. A method comprising:
- obtaining a single stream of audio data that includes overlapping speech from multiple speakers;
- generating a set of frame embeddings from the single stream of audio data using an audio data encoder;
- generating a set of words and channel change (CC) symbols from the set of frame embeddings using a transcript generation model, wherein the CC symbols are included between pairs of adjacent words that are spoken by different people at the same time;
- transforming the set of words and CC symbols into a plurality of transcript lines, wherein words of the set of words are sorted into transcript lines based on the CC symbols; and
- generating a multi-speaker transcript of the single stream of audio data based on the plurality of transcript lines.

8. The method of claim 7, further comprising:
- training the transcript generation model to generate a set of words and CC symbols using a machine learning technique with a training data instance.

9. The method of claim 8, wherein training the transcript generation model includes:
- classifying each word in the set of words into a corresponding channel based on timestamp data associated with the corresponding word;
- inserting a CC symbol between a pair of adjacent words in the set of words based on the corresponding channel classifications associated with the pair of adjacent words; and
- combining the set of words and at least the inserted CC symbol into a training data instance of the set of training data instances.

10. The method of claim 7, further comprising:
- extracting d-vectors associated with portions of the audio data associated with individual speakers from the transcript generation model;
- determining speaker identities based on the extracted d-vectors; and
- assigning the determined speaker identities to transcript lines of the multi-speaker transcript.

11. The method of claim 10, wherein the speaker identities are determined based on differences between the extracted d-vectors.

12. The method of claim 10, wherein the speaker identities are determined based on comparing the extracted d-vectors to speaker profiles, each of the speaker profiles including a speaker identity and an associated d-vector.

* * * * *